United States Patent [19]

Yamada et al.

[11] Patent Number: 4,630,699
[45] Date of Patent: Dec. 23, 1986

[54] DRIVING WHEEL SUPPORTING SYSTEM

[75] Inventors: Kozo Yamada; Yoshikazu Washizawa, both of Saitama, Japan

[73] Assignee: Honda Giken Kogyo Kabushiki Kaisha, Tokyo, Japan

[21] Appl. No.: 718,020

[22] PCT Filed: Jul. 31, 1984

[86] PCT No.: PCT/JP84/00392
§ 371 Date: Mar. 21, 1985
§ 102(e) Date: Mar. 21, 1985

[30] Foreign Application Priority Data

Aug. 2, 1983 [JP] Japan .................... 58-141403

[51] Int. Cl.4 .............................. B60K 17/04
[52] U.S. Cl. ........................ 180/75; 180/209
[58] Field of Search ............ 180/75, 209, 252, 255; 280/43

[56] References Cited

U.S. PATENT DOCUMENTS

| 2,885,018 | 5/1959 | Jackson | 180/75 |
| 3,378,095 | 4/1918 | Sons, Jr. | 180/75 |
| 4,418,783 | 12/1983 | Teraoka et al. | 180/75 |

FOREIGN PATENT DOCUMENTS

| 25396 | 6/1976 | Japan . |
| 43227 | 3/1977 | Japan . |
| 9050 | 3/1978 | Japan . |
| 63523 | 5/1981 | Japan . |

Primary Examiner—Richard A. Bertsch
Attorney, Agent, or Firm—Irving M. Weiner; Joseph P. Carrier; Pamela S. Burt

[57] ABSTRACT

A driving wheel supporting system wherein a pair of plate-like brackets is secured respectively to left and right frames of a vehicle body, and a pipe extends between the brackets for supporting a driving axle shaft, the pipe having one end welded to one of the brackets. An intermediate portion of the pipe is welded to the other bracket and the other end of the pipe projects outwardly from the other bracket. The driving axle shaft is disposed in the pipe and has one end portion supported on a bearing mounted in the other end of the pipe, the one end portion of the driving axle shaft supporting thereon one of left and right wheels. Also provided is a final power transmission unit including a transmission mechanism mounted on the one bracket at one surface thereof extending in a plane outside the frames, the other end of the driving axle shaft being connected to the transmission mechanism. The driving wheel supporting system as thus constructed is reduced in weight and has great strength and rigidity.

3 Claims, 4 Drawing Figures

DRIVING WHEEL SUPPORTING SYSTEM

TECHNICAL FIELD

The present invention relates to a driving wheel supporting system for an engine-powered, three- or four-wheeled off-road vehicle.

BACKGROUND ART

Engine-powered, three- or four-wheeled vehicles equipped with ultra-low pressure tires around the wheels have been practically used for off-road driving or traveling in a farm, a pasture or a desert.

In the vehicles of the type described, it has been customary that left and right driving wheels are secured to the opposite ends of a long axle shaft extending through and rotatably supported, at an intermediate portion thereof, on a tubular supporting member extending transversely between ends of left and right longitudinal support members extending from the vehicle frame along a plane of the vehicle.

According to such prior driving wheel supporting system, the axle shaft is supported at its intermediate portion so that it is subjected to bending stresses due to severe vibrations and shock applied thereto during off-road traveling. In view of the relatively short supporting pipe member, an attempt has been made to enlarge the diameter of the axle shaft as well as the thickness of the supporting pipe member to thereby increase the strength and rigidity of these components. However, such attempt has caused another problem to be solved, namely an increase in weight of the axle shaft and its related components fails to meet the desire for reduction of the overall vehicle weight, results in a high material cost, and causes a substantial power loss.

DISCLOSURE OF THE INVENTION

The present invention has been devised in view of the foregoing drawbacks of the prior art driving wheel supporting systems.

It is accordingly an object of the present invention to provide a driving wheel supporting system for a three- or four-wheeled off-road vehicle, which has sufficient strength and rigidity, is simple in construction and is lightweight.

BEST MODE FOR CARRYING OUT THE INVENTION

Figure 1:
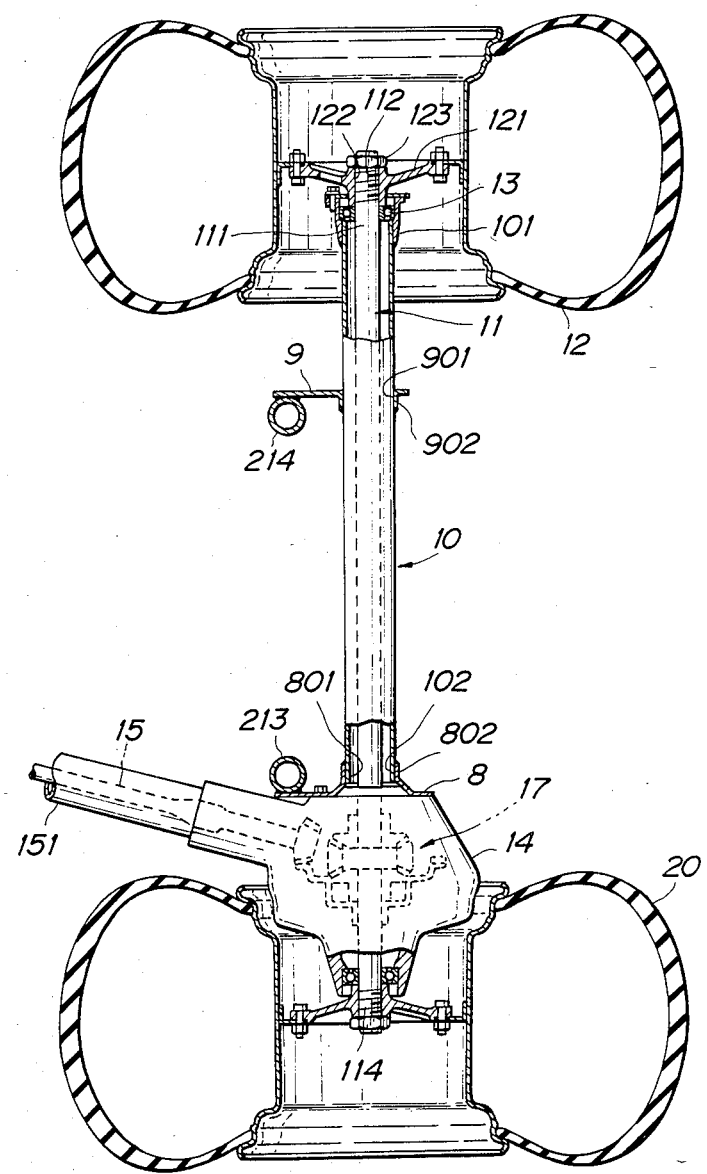
FIG. 1 is an enlarged plan view, partly in cross section, of main portions of FIG. 3.
Figure 2:
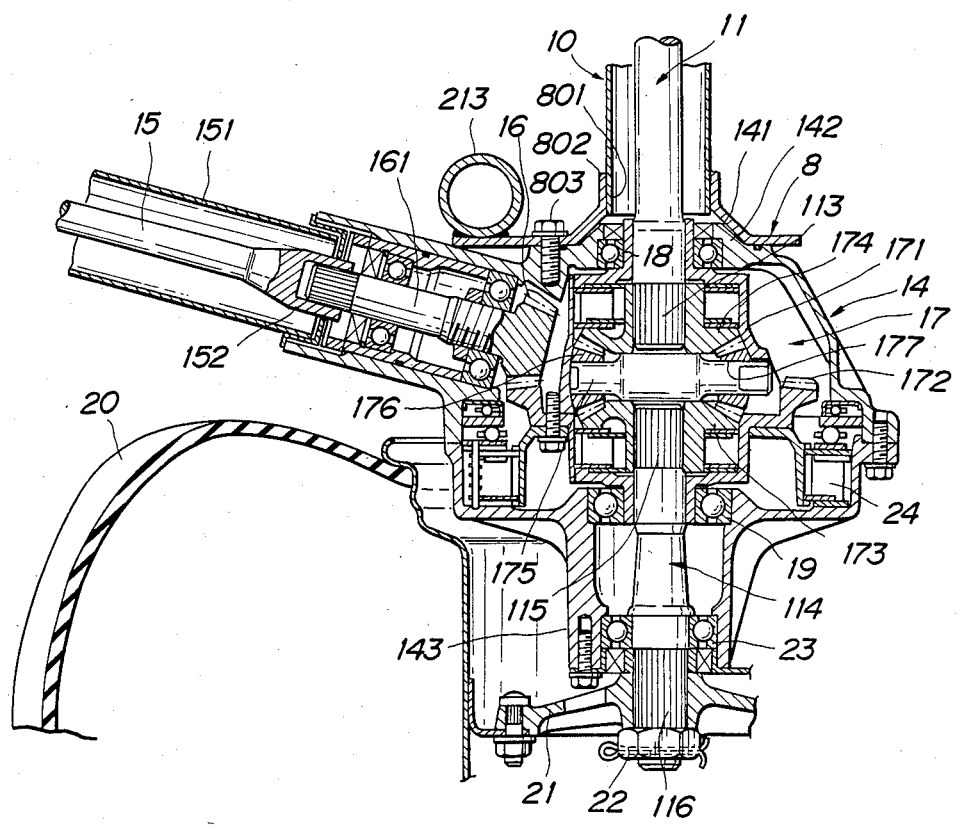
FIG. 2 is an enlarged horizontal cross-sectional view of a final power transmission mechanism.
Figure 3:
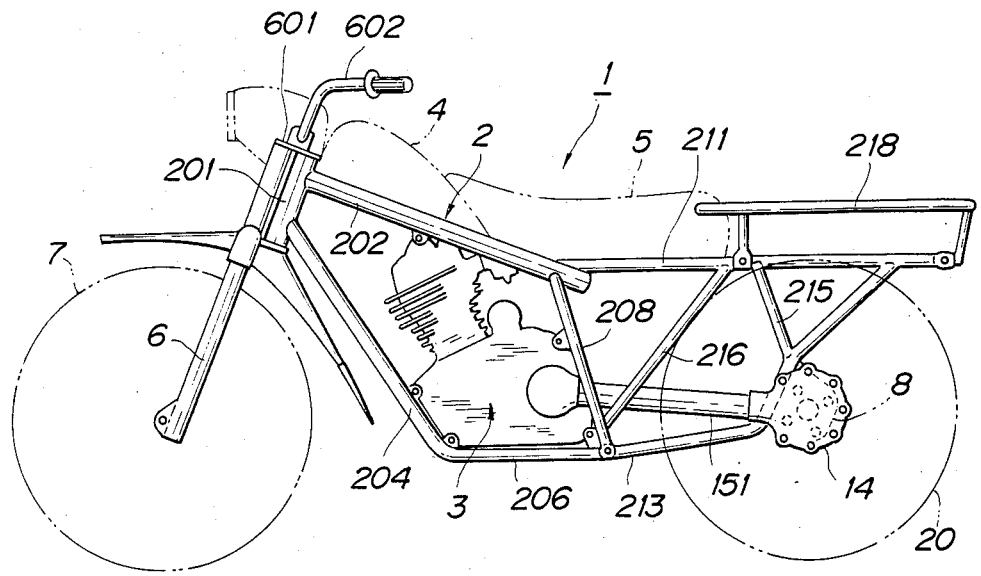
FIG. 3 is a side elevational view of a tricycle or three-wheeled automotive vehicle having a driving wheel supporting system according to the present invention.
Figure 4:
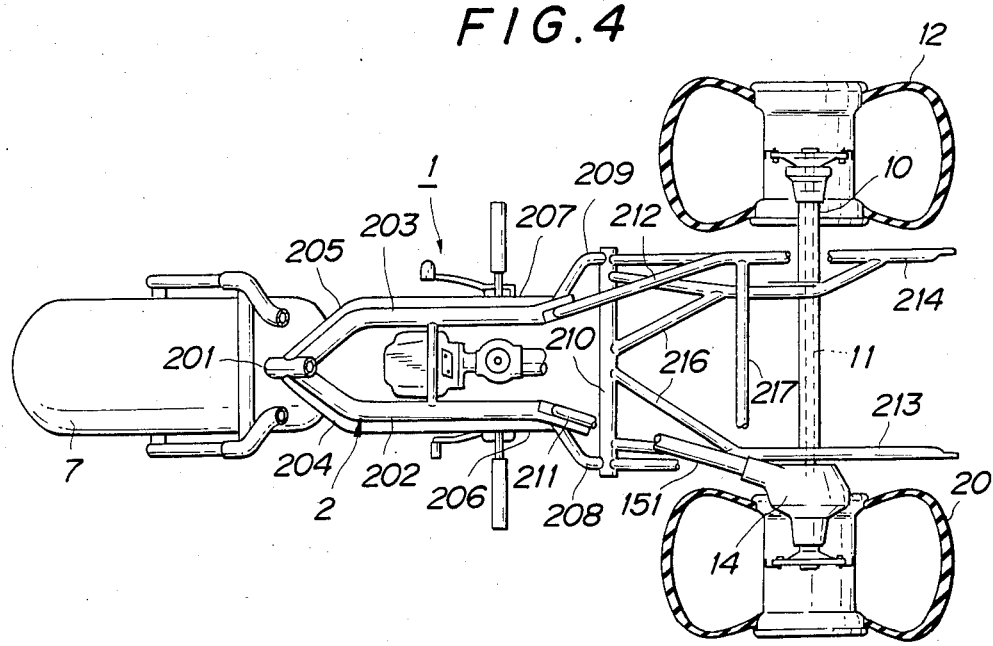
FIG. 4 is a plan view of FIG. 3, with parts cut away.

FIGS. 3 and 4 show a frame of a tricycle or three-wheeled vehicle as an examplary vehicle embodying the present invention. As described above, however, the present invention is also applicable to a four-wheeled vehicle.

The three-wheeled vehicle 1 includes a frame 2 which generally comprises a head tube 201, left and right main frames 202, 203 of large diameter pipes extending rearwardly downward from an upper portion of the head tube 201, left and right down tubes 204, 205 extending rearwardly downward from a lower portion of the head tube 201, left and right lower tubes 206, 207 extending rearward from lower ends of the respective lower tubes 206, 207, left and right middle stays 208, 209 interconnecting, respectively, the rear ends of the down tubes 204, 205 and rear portions of the main frames 202, 203, a cross pipe 210 extending transversely between lower portions of the middle stays 208, 209, left and right seat rails 211, 212 extending rearward from the rear portions of the respective main frames 202, 203, rear frames 213, 214 extending rearward from lower portions of the respective lower tubes 206, 207, then bent upwardly rearward and finally connected at respective upper ends to the rear portions of the respective seat rails 211, 212 a plurality of sub-tubes 215, 216 extending between the seat rails 211, 212 and the rear frames 213, 214 and between the seat rails 211, 212 and the cross pipe 210, and a cross member 217 extending transversely between the seat rails 211, 212. An engine 3 is mounted in a space defined jointly by the main frames 202, 203, the down tubes 204, 205, the lower tubes 206, 207 and the middle stays 208, 209. The main frames 202, 203 support thereon a fuel tank 4 and a seat 5 is supported on the seat rails 211, 212 disposed rearwardly of the main frames 202, 203.

The head tube 201 steerably supports a front fork 6 on which is mounted a front wheel 7 serving as a steerable road wheel. The front fork 6 has a top bridge 601 supporting thereon a handlebar 602.

In the vehicle as thus constructed, the rear wheel supporting system of the present invention is constructed as described below.

A pair of brackets 8, 9 is joined by welding, for example, to rear bottom portions of the respective rear frames 213, 214, the brackets 8, 9 being formed of steel plates. Disposed transversely between the brackets 8, 9 is a retaining pipe 10 for supporting an axle shaft 11 which constitutes a driving axle for rear wheels. The pipe 10 is received in a through-hole 901 defined by a tubular flange 902 on one of the brackets 9 and is welded, at a portion spaced axially inwardly from one end portion 101 of the pipe 10, to the bracket 9 via the through-hole 901 and the flange 902. The other end portion of the pipe 10 is received in and welded to a through-hole 801 defined by a tubular flange 802 on the other bracket 8. Thus, the pipe 10 is fixed to and extends transversely between the brackets 8, 9.

The axle shaft 11 for driving the rear wheels is disposed in the pipe 10 and has one end portion 111 projecting from one end portion 101 of the pipe 10 to some extent, the end portion 111 having an external thread 112. The threaded end portion 111 is fitted in a mounting hole 122 in a hub or disk portion of the rear wheel 12. A nut 123 is threaded on the end portion 111 to thereby fasten the rear wheel 12 to the axle shaft 11. The end portion 111 of the axle shaft 11 is supported on the corresponding end portion 101 of the pipe 10 by means of a bearing 13 interposed between the inner peripheral wall of the end portion 101 and the outer peripheral surface of the end portion 111. In this manner the rear wheel 12 is supported by the bearing 13 at the respective end portions of the axle shaft 11 and the pipe 10.

The bracket 8 is fastened by bolts 803 to a side wall 141 of a gear case 14 disposed outside of the rear frame 213 as a final power transmission mechanism, the gear case 14 housing a differential unit 17. A tubular boot or cover 151 is fitted at its rear end to the front face of the gear case 14 for covering a propeller shaft 15. The propeller shaft 15 has the one or front end portion thereof connected to an output shaft in a transmission coupled with the engine 3. The other or rear end portion 152 of the propeller shaft 15 is connected to a shaft 161 of a drive bevel gear 16 rotatably supported in a front portion of the gear case 14. The bevel gear 16 is held in driving mesh with a crown wheel or driven bevel gear 172 facing the outer peripheral portion of a differential gear box 171 of the differential unit 17. The box 171 houses a pair of opposed differential gears 173, 174 held in mesh with a pair of differential pinions 176, 177 mounted on a common shaft 175 for corotation therewith.

One of the differential gears 174 is connected to the corresponding end portion 113 of the axle shaft 11 through a spline coupling, for example. The gear box 171 has one end portion corresponding in position to the end portion 113 and mounted on a corresponding bearing portion 142 of the gear case 14 via a bearing 18. Thus, the axle shaft 11 is journaled at the end portion 113 on the rigid gear case 14.

Disposed adjacent to the inner end of the axle shaft 11 is a separate axle shaft 114 spaced from the axle shaft 11 by the differential unit 17 interposed therebetween, the axle shafts 11, 114 being disposed coaxially with each other so as to form a single continuous axle. The axle shaft 114 has an inner end portion 115 connected to the differential gear 173 through a spline coupling, for example. The end portion of the gear box 171 that corresponds in position to the end portion 115 is rotatably supported on the gear case 14 by a bearing 19. The outer end portion 116 of the axle shaft 114 projects outwardly from an extension 143 of the gear case 14 and is connected to a hub or disk portion 21 of another rear wheel 20 by means of a nut. The outer end portion 116 is supported on the extension via a bearing 23. Designated at 24 is a brake mechanism.

With the driving wheel supporting system thus constructed, the power is transmitted from the propeller shaft 15 to the axle shafts 11, 114 through the differential gear box 171, thereby driving the rear wheels 12, 20. Although in the illustrated embodiment a shaft drive mechanism is shown as a drive system, a chain drive mechanism may be substituted therefor.

As clear from the foregoing description, according to the invention, the rear frames 213, 214, and the brackets 8, 9 and the pipe 10 are joined together by welding. The pipe 10 as thus joined constitutes a cross member of the frame which serves as a rigid reinforcing member, thereby strengthening the frame as a whole. Since the axle shaft 11 is supported on such pipe 10 via the bearings, the vertical movement of the wheels 12, 20 is transferred directly to the vehicle frame. Thus, a reliable retention of the vibrations and shock from the road surface is attained.

Unlike the conventional axle shaft supported at the intermediate portion thereof, the axle shaft 11 is supported at its ends on the ends of the pipe 10 via the bearings and hence is subjected to only small bending stresses. Further, the pipe itself constitutes a portion of an axle reinforcement member which is advantageous in increasing the strength and rigidity of the axle. This arrangement reduces the diameter of the axle shaft as well as the thickness of the pipe, lightening the weight of these components. Another advantage resides in that the axle shaft is substantially fully concealed by the pipe and hence is protected from being damaged.

CABABILITY OF EXPLOITATION IN INDUSTRY

According to the present invention, a driving wheel supporting system for an off-road vehicle comprises a pipe extending transversely between left and right frame members as a portion of the vehicle frame, and an axle shaft disposed in the pipe and rotatably supported at opposite ends thereof on the pipe through bearings. The driving supporting system as thus constructed is light in weight and has great strength and rigidity.

We claim:

1. A driving wheel supporting system comprising: a pair of plate-like brackets secured respectively to the left and right frames of a vehicle body; a pipe extending between said brackets for supporting a driving axle shaft, said pipe having one end welded to one of said brackets, an intermediate portion welded to the other bracket and the other end projecting outwardly from said other bracket, said driving axle shaft being disposed in said pipe and having one end portion supported on a bearing mounted in said other end of said pipe, said one end portion of said driving axle shaft supporting thereon one of left and right wheels; and a final power transmission unit including a transmission mechanism mounted on said one bracket at one surface thereof extending in a plane outside said frames, the other end of said driving axle shaft being connected to said transmission mechanism and being supported on a bearing mounted therein.

2. A driving wheel supporting system according to claim 1, wherein said transmission mechanism comprises a shaft drive mechanism and includes differential unit driven by an engine through a propeller shaft, said differential unit including a pair of differential gears one of which is connected to said other end of said driving axle shaft, the other differential gear being connected to a separate axle shaft disposed coaxially with said driving axle shaft to substantially form an end portion of the latter, said separate axle shaft having an outwardly projecting extension for supporting thereon the other drive wheel.

3. A driving wheel supporting system according to claim 2, wherein said differential unit is housed in a gear case, said separate axle shaft having one end supported on a bearing which is mounted in said gear case for supporting said other differential gear, and the other end supported on a bearing interposed between said separate axle shaft and said gear case.

* * * * *